(12) United States Patent
Jha et al.

(10) Patent No.: US 8,793,594 B2
(45) Date of Patent: Jul. 29, 2014

(54) GRAPHICAL USER INTERFACE FOR MANAGING DISCUSSION TOPICS

(76) Inventors: Deepshikha Jha, Sunnyvale, CA (US); Dmitri I. Krakovsky, San Francisco, CA (US); Victor Tao, Union City, CA (US); Kendra Bittner, Fremont, CA (US); Michael S. Dandan, San Jose, CA (US); Dominic Philip Haine, San Francisco, CA (US); Simon Gershey, Bellevue, WA (US)

( * ) Notice: Subject to any disclaimer, the term of this patent is extended or adjusted under 35 U.S.C. 154(b) by 153 days.

(21) Appl. No.: 13/490,271

(22) Filed: Jun. 6, 2012

(65) Prior Publication Data
US 2013/0332853 A1    Dec. 12, 2013

(51) Int. Cl.
*G06F 3/048* (2013.01)
(52) U.S. Cl.
USPC .......................................... 715/753
(58) Field of Classification Search
USPC .......................................... 715/753
See application file for complete search history.

(56) References Cited

U.S. PATENT DOCUMENTS

| | | | |
|---|---|---|---|
| 6,006,215 A * | 12/1999 | Retallick ............................... | 1/1 |
| 8,255,950 B1 * | 8/2012 | Wick et al. ...................... | 725/37 |
| 2004/0210470 A1 | 10/2004 | Rusk | |
| 2007/0168447 A1 * | 7/2007 | Chen et al. ..................... | 709/207 |
| 2009/0094623 A1 * | 4/2009 | Chakra et al. ................. | 719/329 |
| 2009/0106676 A1 * | 4/2009 | Brezina et al. ................ | 715/763 |
| 2009/0234894 A1 | 9/2009 | Alexander et al. | |
| 2009/0254563 A1 * | 10/2009 | Arnold et al. ................... | 707/10 |
| 2009/0307045 A1 * | 12/2009 | Chakra et al. .................... | 705/9 |
| 2010/0125814 A1 | 5/2010 | Lemons | |
| 2010/0223089 A1 * | 9/2010 | Godfrey et al. .................. | 705/9 |
| 2010/0250322 A1 | 9/2010 | Norwood | |
| 2010/0262653 A1 | 10/2010 | Chaffee et al. | |
| 2011/0037714 A1 * | 2/2011 | Seo et al. ..................... | 345/173 |
| 2012/0197523 A1 * | 8/2012 | Kirsch .......................... | 701/426 |

* cited by examiner

*Primary Examiner* — Omar Abdul-Ali
*Assistant Examiner* — Anil Bhargava
(74) *Attorney, Agent, or Firm* — Fountainhead Law Group PC

(57) ABSTRACT

One embodiment of the present invention sets forth a technique for managing discussion topics between two users. The technique involves generating a first graphical user interface (GUI) that displays a listing of one or more users with whom a first user is associated, receiving from a first user a selection of a second user from the listing of one or more users, generating a second GUI that displays a listing of topics that corresponds to both the first user and the second user, receiving from the first user data associated with a first topic to be discussed with the second user, and adding the first topic to the listing of topics.

24 Claims, 7 Drawing Sheets

GRAPHICAL USER INTERFACE FOR MANAGING DISCUSSION TOPICS

BACKGROUND

1. Field of the Invention

The present invention generally relates to graphical user interfaces and, more specifically, to a graphical user interface for managing discussion topics.

2. Description of the Related Art

In business and personal relationships, two or more individuals can meet to discuss topics and/or manage projects. Meeting discussions typically include current projects/topics and/or future projects/topics. The discussions can be quite complex and involve several different issues.

Oftentimes, an individual makes reminders to himself or herself of issues or topics to discuss with one or more other individuals at the next opportunity. The issues or topics for future discussion are often realized by the individual at a time when he or she is not presently meeting with the other individual(s) with which the issue or topic is to be discussed. Therefore, the individual needs to document his or her thoughts as a "reminder" to discuss the issue or topic at the next occasion. Examples of forms for making reminders include sending emails-to-self, writing sticky notes, creating calendar entries, and the like. Unfortunately, it can become cumbersome for the individual to manage various reminders, especially when the number of reminders is larger or when the reminders are made in various forms (email, sticky note, calendar entries, etc.). As a result, issues are often overlooked at the next meeting between an individual and the other individual(s) with which the issue should have been discussed.

As the foregoing illustrates, what is needed in the art is a more effective way to manage discussion topics.

SUMMARY

One embodiment of the present invention sets forth a method for managing discussion topics between two users. The method involves generating a first graphical user interface (GUI) that displays a listing of one or more users with whom a first user is associated, receiving from a first user a selection of a second user from the listing of one or more users, generating a second GUI that displays a listing of topics that corresponds to both the first user and the second user, receiving from the first user data associated with a first topic to be discussed with the second user, and adding the first topic to the listing of topics.

Further embodiments provide a non-transitory computer-readable medium and a computer system to carry out the method set forth above.

BRIEF DESCRIPTION OF THE DRAWINGS

So that the manner in which the above recited features of the present invention can be understood in detail, a more particular description of the present invention, briefly summarized above, may be had by reference to embodiments, some of which are illustrated in the appended drawings. It is to be noted, however, that the appended drawings illustrate only typical embodiments of the present invention and are therefore not to be considered limiting of its scope, for the present invention may admit to other equally effective embodiments.

DETAILED DESCRIPTION

In the following description, numerous specific details are set forth to provide a more thorough understanding of embodiments of the invention. However, it will be apparent to one of skill in the art that embodiments may be practiced without one or more of these specific details. In other instances, well-known features have not been described in order to avoid obscuring embodiments of the present invention.

Figure 1:
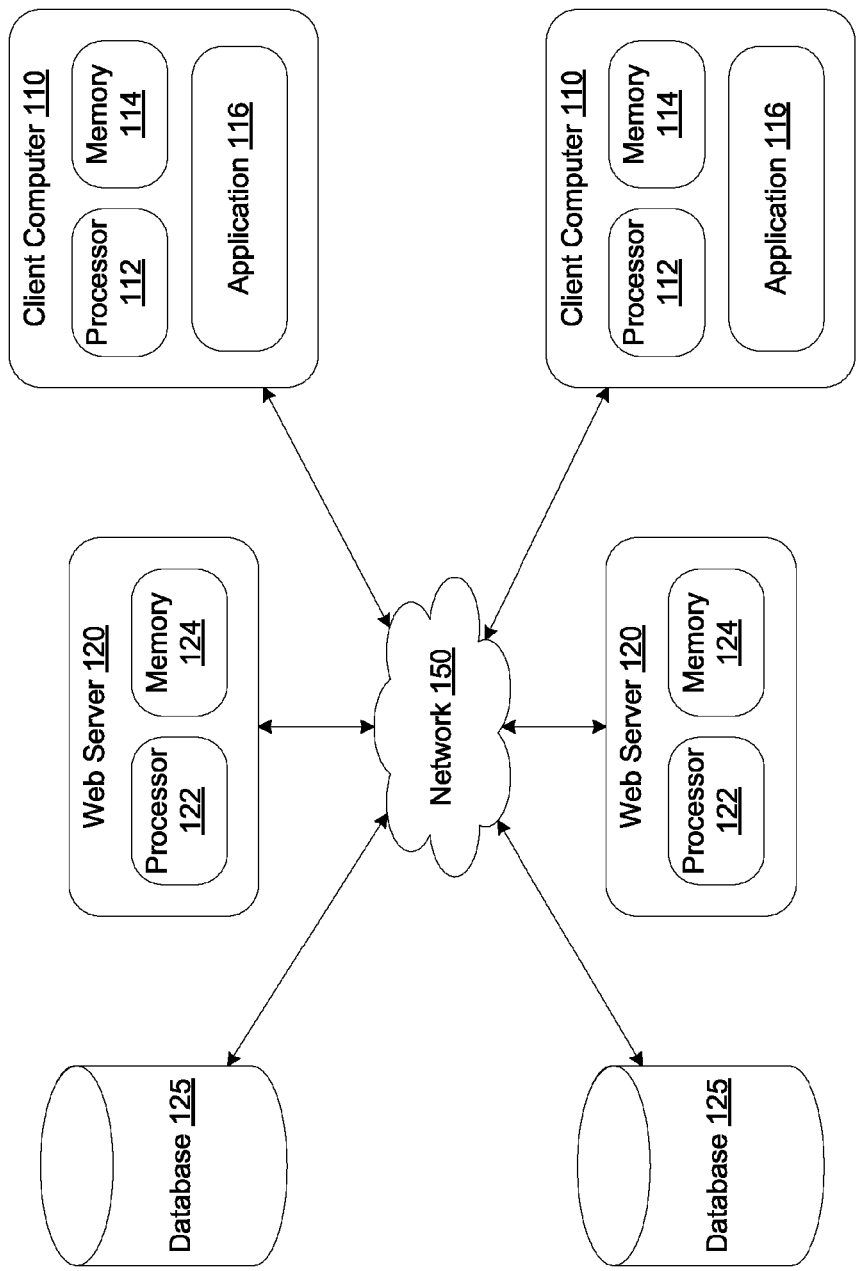
FIG. 1 illustrates a computer system configured to implement one or more aspects of the present invention.

FIG. 1 illustrates a networked computer environment in which embodiments of the invention may be practiced. As shown, the networked computer environment includes client computers 110 (only two of which are shown), web servers 120, and databases 125. The client computers 110, the web servers 120, and databases 125 are connected to one another over a computer network 150, e.g., the Internet.

Each client computer 110 includes conventional components of a computing device, e.g., a processor 112, system memory 114, a persistent storage device, input devices such as a mouse and a keyboard, touch screen inputs, along with output devices such as a monitor. Each web server 120 includes a processor 122 and a system memory 124. In one embodiment, each web server 120 is associated with a corresponding database and manages the contents stored in the corresponding database 125. Each web server 120 is programmed to communicate with the client computers 110 and other web servers 120 via the computer network 150 using a network protocol, e.g., the TCP/IP and/or the HTTP protocol. The client computers 110 are programmed to execute web browser programs and other software applications (illustrated in FIG. 1 as application(s) 116) and access the web pages and/or applications managed by the web servers.

In the embodiments described below, users are manipulating and/or operating the client computers 110 that are connected to the web servers 120 over the computer network 150. In one embodiment, user interfaces in the form of web pages are transmitted from the web servers 120 to a user's client computer 110. The web pages are processed by a web browser program stored in that user's client computer 110 for display through the monitor of that user's client computer 110. In another embodiment, user interfaces are generated by an application executing locally on that user's client computer 110, e.g., an application 116, and the application 116 transmits data to and receives data from the web server(s) 120.

Each client computer 110 may be a personal computer, smart phone, tablet computer, or any other device suitable for practicing one or more embodiments of the present invention. It should be noted that embodiments of the present invention can be implemented in hardware, software, or in a combination of hardware and software, e.g., using application specific integrated circuits (ASIC), a general purpose computer, or any other hardware equivalents.

Figure 2:
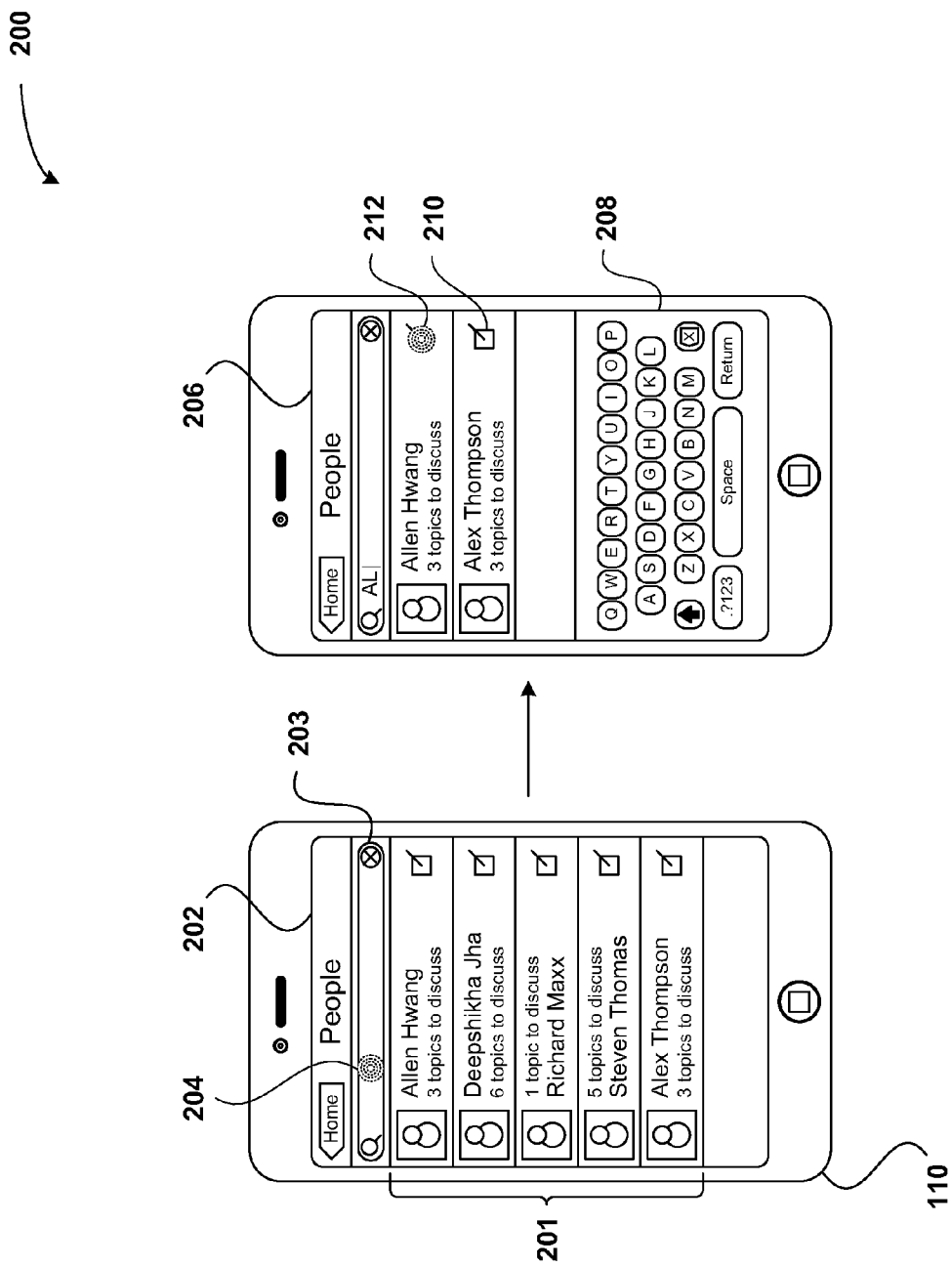
FIG. 2 depicts a conceptual diagram of a user interface for managing a list of individuals with whom a user has topics to discuss, according to one embodiment of the present invention.

FIG. 2 depicts a conceptual diagram 200 of a user interface for managing a list of individuals with whom a user has topics to discuss, according to one embodiment of the present invention. In the example illustrated in FIG. 2, a GUI 202 includes a list of individuals 201 with whom a first user has established topics to discuss, e.g., three topics with Allen Hwang, six topics with Deepshikha Jha, one topic with Richard Maxx, five topics with Steven Thomas, and three topics with Alex Thompson. In one embodiment, the GUI 202 may further include a list of individuals with whom the user is most likely to have topics to discuss, such as the user's managers and subordinates, which can be determined, for example, by parsing data that defines an organizational hierarchy of the company for which the first user works.

In the example shown in FIG. 2, the topics associated with Allen Hwang, Deepshikha Ja and Richard Max are created by either the first user or the other individuals according to the techniques described below in conjunction with FIGS. 3A-5. The GUI 202 and the other GUIs described herein are rendered by the application 116 executing on the user's client computer 110. The GUI 202 also includes a search field 203 that enables the first user to search for specific individuals with whom he or she is associated, e.g., individuals listed in a company directory to which the application 116 has access, or personal contacts included in a contacts list to which the application 116 has access.

To search for an individual, the first user establishes a selection input 204 within the boundaries of the search field 203 and enters one or more characters that are included in the individual's name. The selection input 204 represents a selection made by the first user, e.g., a touch of the first user's finger or a stylus to a touch sensitive display device that is included in the client computer 110, or a click of a mouse input device that is attached to the client computer 110. When the first user accesses the search field 203 using any of the foregoing techniques, the application 116 in turn generates GUI 206 and searches for individuals based on text input submitted by the first user via the search field 203. In the example illustrated in FIG. 2, the first user submits the text "AL" via a virtual keyboard 208 included in the GUI 206, whereupon the application 116 correspondingly updates the list of individuals 201 to include only Allen Hwang and Alex Thompson since these the individuals whose names include the text "AL".

Next, the first user selects one individual from GUI 206 in order to manage one or more topics to discuss with that individual. Managing topics includes adding, editing, and removing topics. An added topic is initially marked with an "open" status, and can subsequently be marked with a "completed," "postponed" or "removed" status, the details of which are described in detail below in conjunction with FIGS. 3A-3C. As shown in the GUI 206, each of the entries in the list of individuals 201 includes an edit button 210 that, when selected by the first user, causes the application 116 to display a GUI that includes a list of current topics associated with the corresponding individual. In the example illustrated in FIG. 2, the user establishes a selection input 212 at the edit button associated with Allen Hwang. In turn, the application 116 displays a GUI 302, as shown in FIG. 3A, that includes a list of current topics 301 associated with the selected individual (e.g., Allen Hwang), the details of which are described in detail below in conjunction with FIGS. 3A-3B.

Figure 3A:
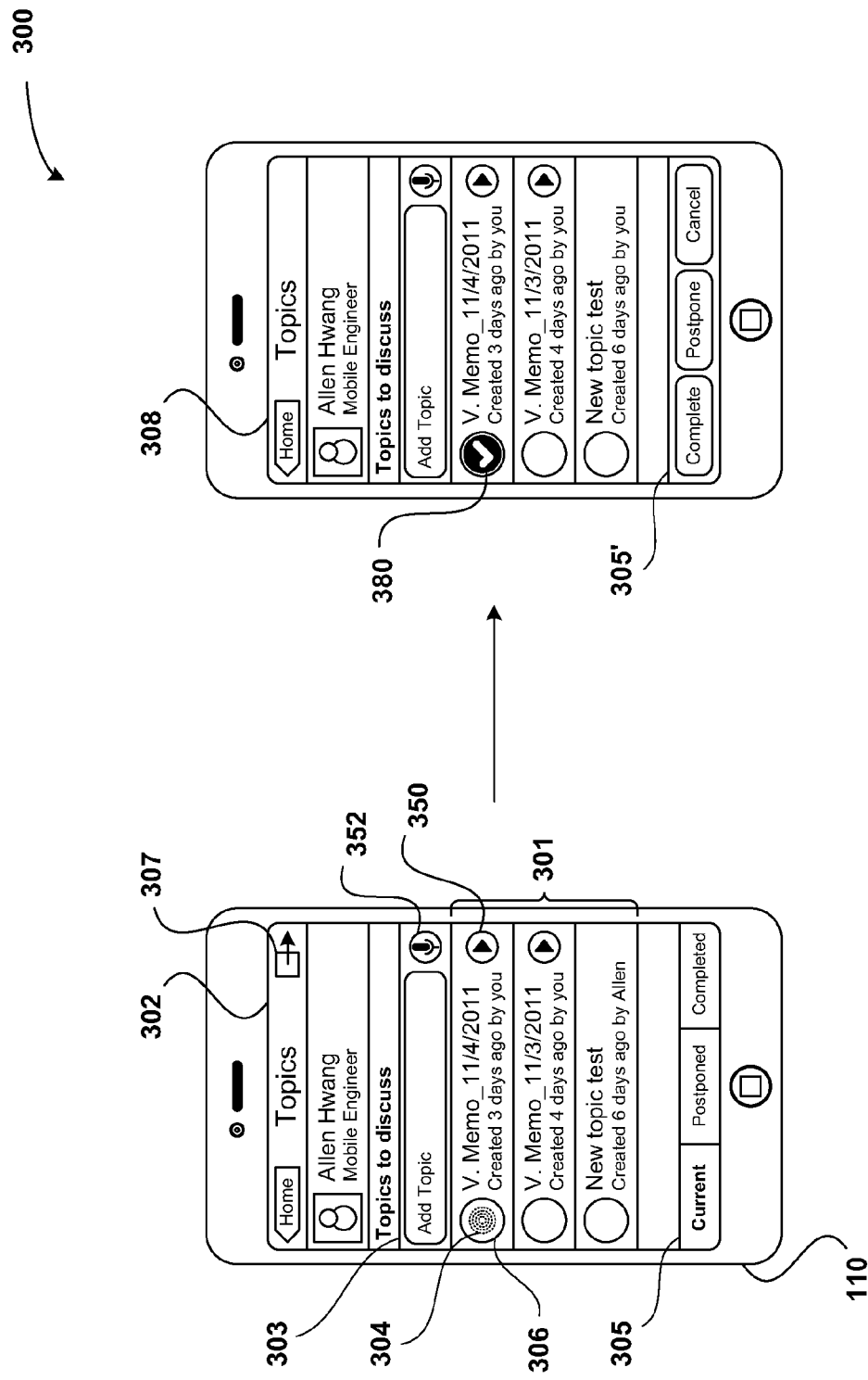
FIGS. 3A-3C depict conceptual diagrams of user interfaces for managing a list of topics to discuss with a particular individual, according to various embodiments of the present invention.
Figure 3B:
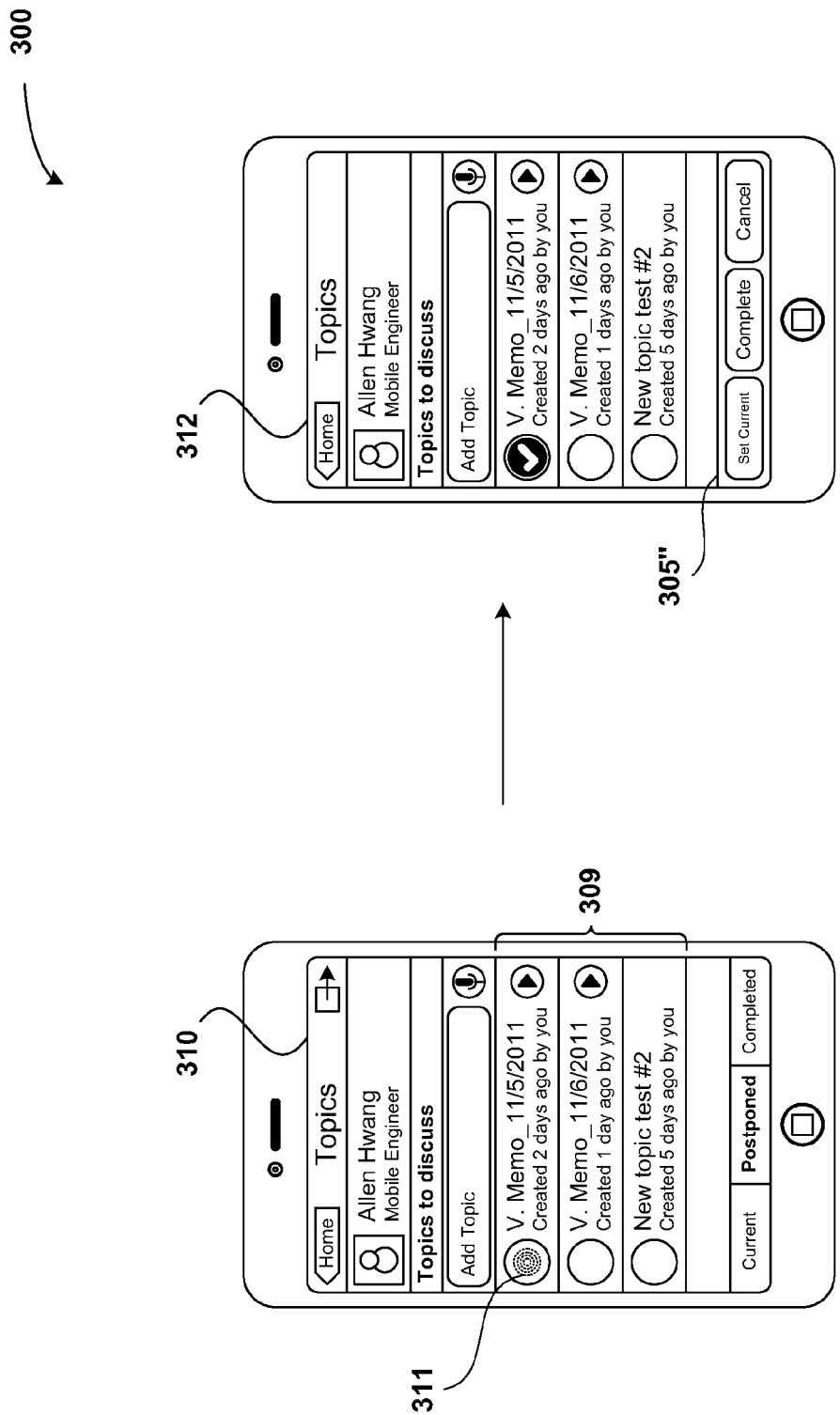
Figure 3C:
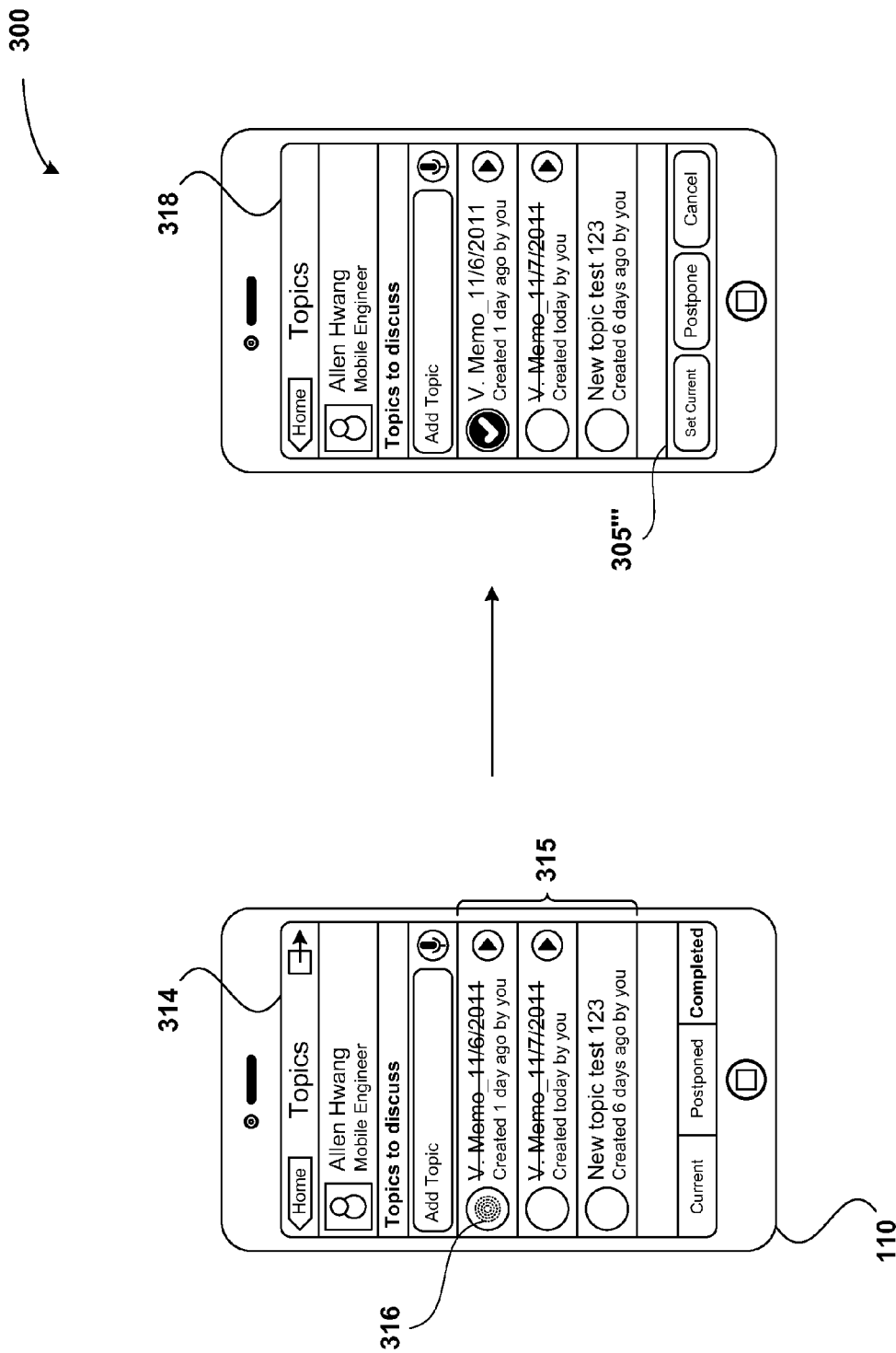

FIGS. 3A-3C depict conceptual diagrams 300 of user interfaces for managing a list of topics to discuss with a particular individual, according to embodiments of the present invention. As described above, the GUI 302 is displayed by application 116 in response to the first user selecting the edit button 210 associated with selected particular individual (e.g., Allen Hwang). As shown in FIG. 3A, the GUI 302 includes an add topic section 303 that enables the first user to submit to the application 116 text data, video data, picture data, and/or audio data for a new topic that the first user desires to discuss with the particular individual. The application 116 obtains the text, video, picture, and audio data from various hardware and software resources included in the client computer 110 being operated by the user, e.g., through a virtual keyboard, a microphone, a camera, and a video camera, and may do so by selecting the media icon 352 included in GUI 302. The GUI 302 also includes an action button 307 that enables the first user to perform various operations using the current task list 301, the details of which are described in detail below in conjunction with FIG. 4.

The list of current topics 301 includes topics that have been created by either the first user or the particular individual (e.g., Allen Wang). The example in FIG. 3A shows a voice memo titled "V. Memo__11/4/2011" created by the first user, a voice memo titled "V. Memo__11/3/2011" created by the first user, and a text memo titled "New topic test" created by the other individual, e.g., Allen Hwang. The first user is able to view video, picture, or audio data of a topic by selecting the play icon 350 included in each topic entry. The first user is also able to modify the title of a topic by establishing a selection input over the title text included in each topic entry, e.g., "V. Memo__11/3/2011". The first user is further able to initiate the recording of audio data for a new topic with the other individual by establishing a prolonged selection input (i.e., a press-and-hold on a touch sensitive display device that is included in the client computer 110, or a click-and-hold of a mouse input device that is attached to the client computer 110) within the boundaries of an entry for that individual included in GUI 202 or GUI 206.

As described herein, the first user is able to mark a topic as open, completed, postponed, or removed. Accordingly, the GUI 302 includes a context menu 305, shown in GUI 302 in FIG. 3A, that enables the first user to view the list of current topics 301, a list of postponed topics 309, and a list of completed topics 315 (illustrated in FIG. 3B).

As shown in FIG. 3A, the first user selects the voice memo titled "V. Memo__11/4/2011" by establishing a selection input 304 in the respective marker 306, which in turn causes application 116 to display a GUI 308. The GUI 308 includes a modified context menu 305' that displays marking options based on the current view through which the first user is viewing the topics, i.e., the list of current topics 301, the list of postponed topics 309, and the list of completed topics 315. Thus, the modified context menu 305' enables the first user to mark the voice memo titled "V. Memo__11/4/2011" as either a completed topic or a postponed topic, since the topic is presently included in the list of current topics 301. A checkbox 380 is displayed within the marker 306 of any topic that will be marked as completed or postponed according to input made by the user within the context menu 305'. The GUI 308 enables the user to select additional topics to be marked, e.g., the voice memo titled "V. Memo__11/3/2011," such that the first user may simultaneously mark two or more topics as completed or postponed. In one embodiment, the application 116 is configured to display the list of topics associated with the selection that is made by the first user, e.g., the completed list of topics 315 when the user selects the "Complete" option in the modified context menu 305', or the list of postponed topics 309 when the first user selects the "Postpone" option in the modified context menu 305'. In another embodiment, the application 116 is configured to display the list of topics that was displayed prior to the user selecting one or more of the markers 306, i.e., the list of current topics 301.

As described above, context menu 305 enables the first user to view the list of current topics 301, the list of postponed topics 309, or the list of completed topics 315. FIG. 3B illustrates GUI 310, which includes an exemplary list of postponed topics 309 that is displayed to the first user by application 116 when the first user selects the "Postponed" option included in the context menu 305. As shown, the list of postponed topics 309 includes a voice memo titled "V. Memo_11/5/2011", a voice memo titled "V. Memo_11/5/2011", and a text memo titled "New topic test #2". As described above, selection of a marker 306 causes application 116 to modify the context menu 305 based on the list of topics that is being displayed to the first user. For example, when the user establishes a selection input 311 in the marker 306 for the topic titled "V. Memo_11/5/2011," the application 116 in turn displays modified context menu 305" within GUI 312, which enables the first user to mark the topic titled "V. Memo_11/5/2011" and any additional topics included in the list of postponed topics 309 as current or completed.

In addition, the first user may desire to set one or more completed topics back to a current or postponed state. FIG. 3C illustrates a GUI 314 that is displayed by application 116 in response to the first user selecting the "Completed" option included in the context menu 305. As shown, a list of completed topics 315 includes a voice memo titled "V. Memo_11/6/2011," a voice memo titled "V. Memo_11/7/2011," and a text memo titled "New topic test 123." Again, selection of a marker 306 causes application 116 to modify the context menu 305 based on the list of topics that is being displayed to the first user. For example, when the first user establishes a selection input 316 in the marker 306 for the topic titled "V. Memo_11/6/2011," the application 116 in turn displays modified context menu 305," which enables the user to mark the topic titled "V. Memo_11/6/2011" and any additional topics included in the list of completed topics 310 as current or postponed.

Additionally, the first user may desire to remove one or more topics from a list of current topics, e.g., the list of current topics 301. In one embodiment, topics included in the list of current topics 301 can be removed by way of common delete functionality that is particular to the operating system being executed on client computer 110. For example, if the client computer 110 executes the iOS operating system developed by Apple™, then the first user may be permitted to swipe his or her finger in a left-to-right direction across one of the topics included in the list of current topics 301, in response a "Delete" button appears within the boundaries of the topic and can be selected by the user to cause the topic to be marked as removed. In turn, the topic is removed from the list of current topics 301, but the data thereof may be archived in database 125. In this way, archived topics can be reviewed at a later time, e.g., to assist in a performance review of the first user by identifying his or her level of involvement with other coworkers.

Figure 4:
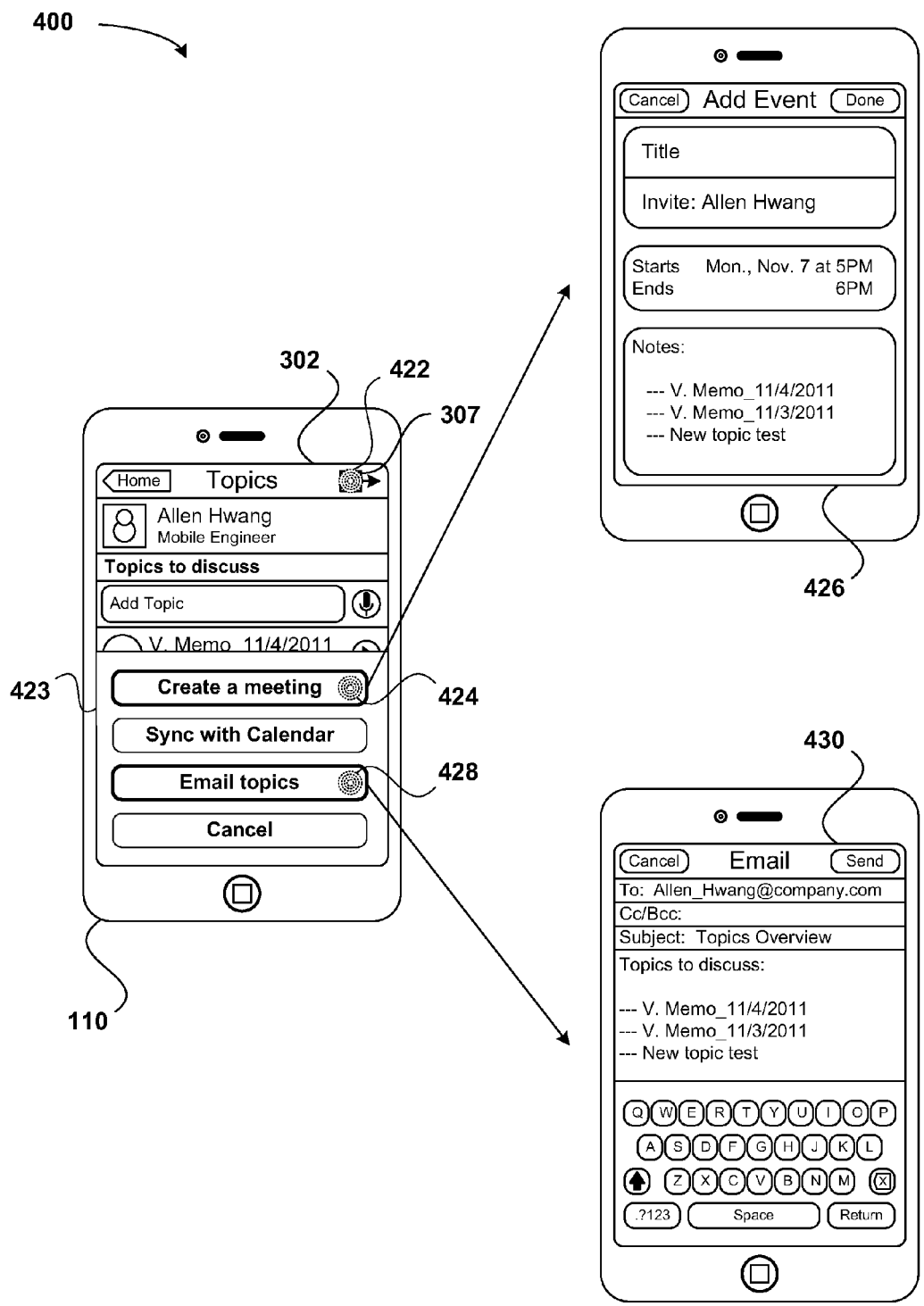
FIG. 4 is a conceptual diagram of a user interface for creating a calendar event for a meeting with an individual or emailing the topics directly to the individual, according to one embodiment of the present invention.

FIG. 4 is a conceptual diagram 400 of a first user creating a calendar event for a meeting with an individual or emailing the topics directly to the individual, according to various embodiments of the present invention. As shown, the first user establishes a selection input 422 at an action button 307, which in turn causes the application 116 to display a context menu 423 that includes options for the first user to select one of several actions.

In one example, the user selects, via a selection input 424, an option to create a meeting based on the list of current topics 301. In response, the application 116 displays GUI 426. As shown in GUI 426, the application 116 generates a new calendar event that is automatically configured to include the first user and the other individual associated with the list of current topics 301 included in the GUI 302 as participants in the new calendar event. In addition, the list of current topics 301 may be included in the "Notes" section for the new calendar event. When the first user supplements the information included in the calendar event (e.g., by inputting a meeting title) and/or selecting the "Done" button included in the GUI 426, the application 116 automatically issues an invite to the other individual (e.g., Allen Hwang). The other individual can then response to or modify properties of the meeting (e.g., request a different meeting time/location). If the list of current topics 301 includes entries that are created using media items (e.g., photo, video, or audio data), then the application 116 includes the media items as objects that are embedded into the calendar event such that the first user and/or the other individual (e.g., Allen Hwang) may easily locate the media items when they conduct the scheduled meeting. Additionally, the application 116 may be configured to automatically set a reminder to pop-up on the client computer 110 for the calendar event. The reminder is set to pop-up according to either a pre-defined time value or according to a preferred time value of the user, e.g., one hour prior to the time of the calendar event.

In another example, the application 116 displays a GUI 430 in response to the first user selecting, via a selection input 428, an option to email the list of current topics 301 directly to the other individual (e.g., Allen Hwang). In particular, the application 116 generates a draft email that is addressed to the other individual's email address, which the application 116 obtains from local data stored on the client computer 110 on which the application 116 is executing or from data stored in database(s) 125 and provided to the application 116 by web server(s) 120. As shown, the application 116 may include the list of current topics 301 in the body of the draft email. If the list of current topics 301 includes entries that are created using media items (e.g., photo, video, or audio data), then the application 116 may include the media items as attachments to the email.

Additionally, the first user may select the "Sync with Calendar" option included in the context menu 423. When the first user selects this option, the application 116 updates the "Notes" section of any existing calendar events that include both the first user and the other individual (e.g., Allen Hwang) as participants. In this manner, the first user is not required to repeatedly cancel and recreate meetings each time the first user modifies the list of topics to discuss with the other individual. In some embodiments, the application 116 updates only the next three calendar events that include both the first user and the other individual as participants when the application 116 identifies four or more calendar events that include both the first user and the other individual as participants. In one embodiment, the application 116 determines, prior to displaying the context menu 403, whether there are any existing calendar events that include both the first user and the other individual as participants. In this way, the application 116 can disable the "Sync with Calendar" option within the context menu 403 when there are no calendar events that include both the first user and the other individual as participants.

Figure 5:
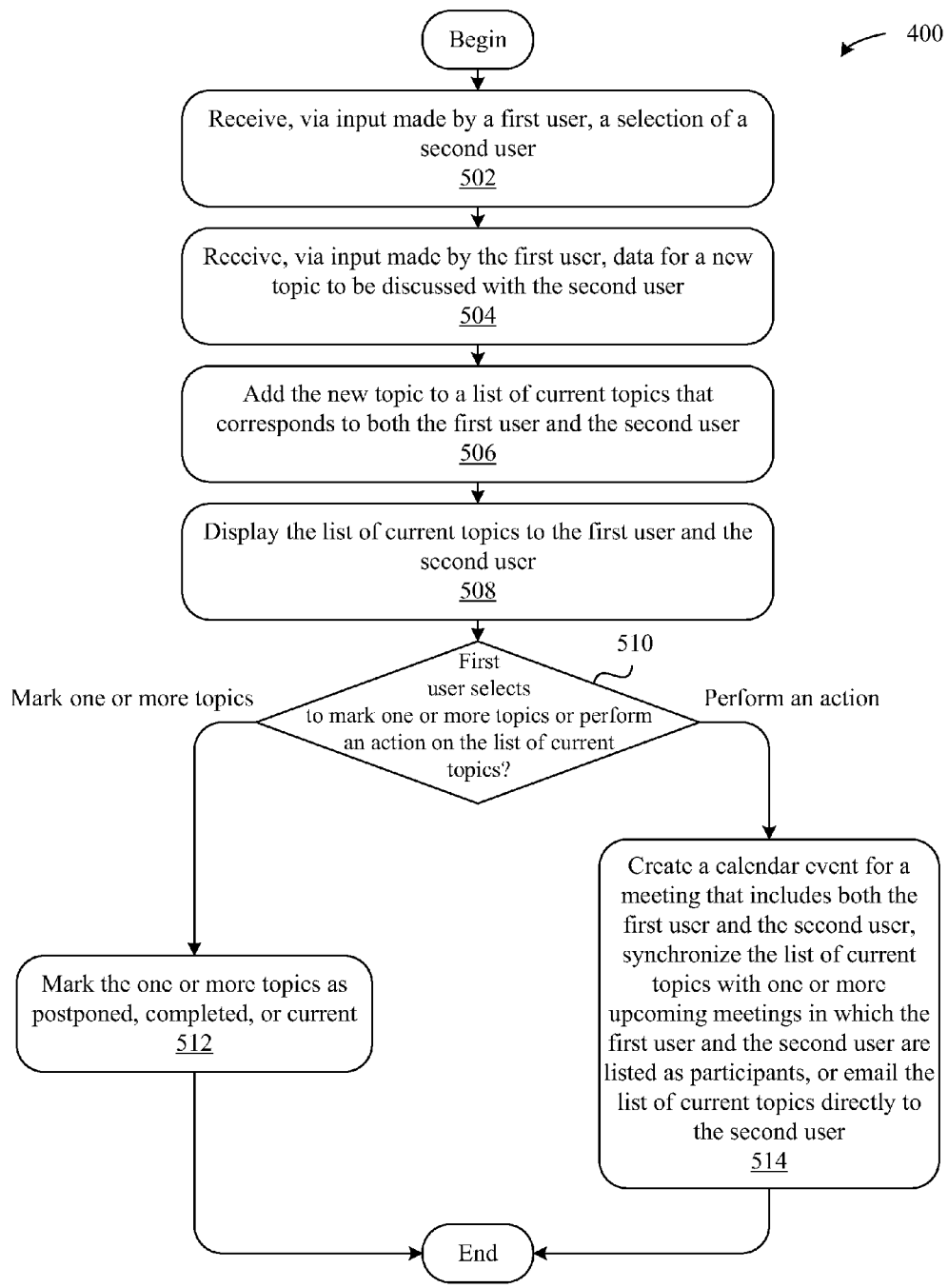
FIG. 5 is a flow diagram of method steps for managing a list of discussion topics between two people, according to one embodiment of the present invention.

FIG. 5 is a flow diagram of method steps 500 for managing a list of discussion topics between two people, according to one embodiment of the present invention. Although the method steps are described in conjunction with FIGS. 1-4, persons skilled in the art will understand that any system configured to perform the method steps, in any order, is within the scope of embodiments of the present invention.

As shown, the method 500 begins at step 502, where an application 116 executing on a client computer 110 receives, via input made by a first user, a selection of a second user. As described above in conjunction with FIG. 2, the first user is able to select the second user via a selection input made within the boundaries of a UI entry for the second user included in the GUI 202 or the GUI 206.

At step 504, the application 116 receives, via input made by the first user, data for a new topic to be discussed with the second user. As described above in conjunction with FIGS. 3A-3C, the first user is able to submit the data via add topic section 303 included in, for example, the GUI 302.

At step 506, the application 116 adds the new topic to a list of current topics that corresponds to both the first user and the second user. In one embodiment, application 116 executes step 506 by first transmitting the new topic to one or more web servers 120, whereupon both the application 116 that corresponds to the first user and an application 116 that corresponds to the second user poll the one or more web servers 120 to refresh the list of current topics. Alternatively, each of the application 116 that corresponds to the first user and the application 116 that corresponds to the second user receive a push notification from the web server 120 that includes the new topic. Subsequently, at step 508, the application 116 that corresponds to the first user displays the list of current topics to the first user, and the application 116 that corresponds to the second user displays the list of current topics to the second user, where the list of current topics includes the new topic.

Additional techniques for adding new topics to the list of current topics and displaying the list of current topics to the first user and the second user may be implemented. In one embodiment, the application 116 on the client device 110 being operated by the first user may directly send the new topic to the application 116 on the client device 110 being operated by the second user, whereupon the application 116 that corresponds to the first user displays the new topic to the first user, and the application 116 that corresponds to the second user displays the new topic to the second user.

At step 510, the application 116 receives input from the first user and determines whether the first user is selecting to mark one or more topics, i.e., via selecting one or more markers 306, or is selecting to perform an action on the current list of topics, i.e., via selecting an option in the context menu 423. If, at step 510, the application 116 determines that the first user selects to mark one or more topics, then the method 500 proceeds to step 512, where the application 116 marks the one or more topics as open, completed, postponed or removed, according to the techniques described above in conjunction with FIGS. 3A-3C.

Conversely, if the application 116 at step 510 determines that the first user selects to perform an action, then the application 116 creates a calendar event for a meeting that includes both the first user and the second user, synchronizes the list of current topics with one or more upcoming meetings in which the first user and the second user are listed as participants, or emails the list of current topics directly to the second user, according to the techniques described above in conjunction with FIG. 4.

In sum, embodiments of the invention enable a user to manage a list of discussion topics for one or more individuals with whom the user is associated. The user selects an individual from a list of individuals and submits one or more discussion topics to discuss with the individual. The discussion topics may be in the form of text data, video data, picture data, and audio data. The list of discussion topics is automatically updated on the individual's computing device so that the individual is able to view the one or more discussion topics submitted by the user. The individual may also submit or modify topics in the list of discussion topics via the second computing device, which in turn causes an updated list of discussion topics to be available the user. Each topic in the list of discussion topics may be marked as open, completed, postponed or removed. Moreover, the user is able to create a calendar event for a meeting with the individual, synchronize the list of discussion topics with one or more upcoming calendar events in which the user and the individual are listed as participants, or email the list of discussion topics directly to the individual. In some embodiments, the list of current topics can be between three or more individuals, and not just between two individuals.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A computer-implemented method for managing discussion topics between a first user and a second user, the method comprising:
    presenting, by a processor, a first graphical user interface (GUI) configured to display a first listing of users with whom the first user is associated;
    first detecting, by the processor, a first selection of the second user from the first listing of users being presented on the first GUI;
    presenting, by the processor, a second GUI to replace the first GUI, the second GUI being configured to display a second listing of topics having the same state for discussion between the first user and the second user in response to detecting the first selection, wherein the second GUI further includes a context menu having a first plurality of selectable icons, wherein the second listing of topics is replaced with a third listing of topics when a first selectable icon from the first plurality of selectable icons is selected;
    second detecting, by the processor, a second selection of a topic displayed in the second GUI; and
    automatically modifying, by the processor, the context menu to display a second plurality of selectable icons, wherein selecting one of the second plurality of selectable icons changes the state of the selected topic.

2. The method of claim 1, further comprising:
    receiving, by the processor, a request to sync the second listing of topics;

identifying, by the processor, a calendar event that includes the first user and the second user as participants in response to the request; and
automatically updating, by the processor, a field of the calendar event to include at least one topic from the second listing of topics.

3. The method of claim 1, further comprising:
receiving, by the processor, a request to generate a calendar event;
creating, by the processor, a calendar event that includes the first user and the second user as participants in response to the request; and
automatically updating, by the processor, a field of the calendar event to include at least one topic from the second listing of topics.

4. The method of claim 1, further comprising:
receiving, by the processor, a request to generate an email;
generating, by the processor, a draft email addressed to the second user in response to the request; and
automatically attaching, by the processor, at least one topic from the second listing of topics to the draft email.

5. The method of claim 1, wherein each topic in the second listing of topics is associated with a state being one of an open state, a completed state, a postponed state or a removed state.

6. The method of claim 1, wherein the second plurality of selectable icons displayed depend on the state of the second listing of topics.

7. The method of claim 1, wherein each topic in the second listing of topics was added by the first user or the second user.

8. The method of claim 1, further comprising:
receiving, by the processor, data associated with a new topic to be discussed with the second user; and
adding, by the processor, the new topic to the second listing of topics.

9. A non-transitory computer-readable medium storing instructions that, when executed by a processor, cause a computer system to manage discussion topics between a first user and a second user, by performing the steps of:
presenting a first graphical user interface (GUI) configured to display a first listing of users with whom the first user is associated;
first detecting a first selection of the second user from the first listing of users being presented on the first GUI;
presenting a second GUI to replace the first GUI, the second GUI being configured to display a second listing of topics having the same state for discussion between the first user and the second user in response to detecting the first selection, wherein the second GUI further includes a context menu having a first plurality of selectable icons, wherein the second listing of topics is replaced with a third listing of topics when a first selectable icon from the first plurality of selectable icons is selected;
second detecting, by the processor, a second selection of a topic displayed in the second GUI; and
automatically modifying, by the processor, the context menu to display a second plurality of selectable icons, wherein selecting one of the second plurality of selectable icons changes the state of the selected topic.

10. The non-transitory computer-readable medium of claim 9, further comprising:
receiving a request to sync the second listing of topics;
identifying a calendar event that includes the first user and the second user as participants in response to the request; and
automatically updating a field of the calendar event to include at least one topic from the second listing of topics.

11. The non-transitory computer-readable medium of claim 9, further comprising:
receiving a request to generate a calendar event;
creating a calendar event that includes the first user and the second user as participants in response to request; and
automatically updating a field of the calendar event to include at least one topic from the second listing of topics.

12. The non-transitory computer-readable medium of claim 9, further comprising:
receiving a request to generate an email;
generating a draft email addressed to the second user in response to the request; and
automatically attaching at least one topic from the second listing of topics to the draft email.

13. The non-transitory computer-readable medium of claim 9, wherein each topic in the listing of topics is associated with a state being one of an open state, a completed state, a postponed state or a removed state.

14. The non-transitory computer-readable medium of claim 9, wherein the second plurality of selectable icons displayed depend on the state of the second listing of topics.

15. The non-transitory computer-readable medium of claim 9, wherein each topic in the second listing of topics was added by the first user or the second user.

16. The non-transitory computer-readable medium of claim 9, further comprising:
receiving, by the processor, data associated with a new topic to be discussed with the second user; and
adding, by the processor, the new topic to the second listing of topics.

17. A computer system, comprising:
a processor; and
a memory storing instructions that, when executed by the processor, cause the computer system to manage discussion topics between a first user and a second user, by performing the steps of:
presenting a first graphical user interface (GUI) configured to display a first listing of users with whom the first user is associated;
first detecting a first selection of the second user from the first listing of users being presented on the first GUI;
presenting a second GUI to replace the first GUI, the second GUI being configured to display a second listing of topics having the same state for discussion between the first user and the second user in response to detecting the first selection, wherein the second GUI further includes a context menu having a first plurality of selectable icons, wherein the second listing of topics is replaced with a third listing of topics when a first selectable icon from the first plurality of selectable icons is selected;
second detecting, by the processor, a second selection of a topic displayed in the second GUI; and
automatically modifying, by the processor, the context menu to display a second plurality of selectable icons, wherein selecting one of the second plurality of selectable icons changes the state of the selected topic.

18. The system of claim 17, further comprising:
receiving a request to sync the second listing of topics;
identifying a calendar event that includes the first user and the second user as participants in response to the request; and
automatically updating a field of the calendar event to include at least one topic from the second listing of topics.

19. The system of claim 17, further comprising:
receiving a request to generate a calendar event;
creating a calendar event that includes the first user and the second user as participants in response to request; and
automatically updating a field of the calendar event to include at least one topic from the second listing of topics.

20. The system of claim 17, further comprising:
receiving a request to generate an email;
generating a draft email addressed to the second user in response to the request; and
automatically attaching at least one topic from the second listing of topics to the draft email.

21. The system of claim 17, wherein each topic in the second listing of topics is associated with a state being one of an open state, a completed state, a postponed state or a removed state.

22. The system of claim 17, wherein the second plurality of selectable icons displayed depend on the state of the second listing of topics.

23. The system of claim 17, wherein each topic in the second listing of topics was added by the first user or the second user.

24. The system of claim 17, further comprising:
receiving, by the processor, data associated with a new topic to be discussed with the second user; and
adding, by the processor, the new topic to the second listing of topics.

\* \* \* \* \*